United States Patent [19]

Petcen

[11] Patent Number: 4,543,146
[45] Date of Patent: Sep. 24, 1985

[54] WRINKLE PREVENTION IN GLASS/PLASTIC COMPOSITE LENSES

[75] Inventor: Donald H. Petcen, Colonial Heights, Va.

[73] Assignee: Coburn Optical Industries, Inc., Muskogee, Okla.

[21] Appl. No.: 656,811

[22] Filed: Oct. 1, 1984

Related U.S. Application Data

[62] Division of Ser. No. 487,658, Apr. 22, 1983, Pat. No. 4,494,344.

[51] Int. Cl.⁴ .............................................. B32B 31/20
[52] U.S. Cl. ......................................... 156/242; 65/37; 65/39; 65/42; 156/245; 156/323; 264/1.7; 351/177
[58] Field of Search ....................... 156/242, 245, 323; 264/1.1, 1.7, 2.7; 351/159, 166, 177; 65/30, 38, 39, 42, 61; 38/102.2, 102.3, 102.4, 102.91

[56] References Cited

U.S. PATENT DOCUMENTS

| | | | |
|---|---|---|---|
| 3,322,598 | 5/1967 | Marks et al. | 264/1.7 |
| 3,960,627 | 6/1976 | Halberschmidt et al. | 156/323 |
| 4,264,156 | 4/1981 | Spycher | 65/38 |
| 4,340,439 | 7/1982 | Giesler | 156/323 |

Primary Examiner—Caleb Weston

[57] ABSTRACT

A method of minimizing distortion and preventing wrinkles in optical plastic-glass composites utilizing a lens-laminating mechanism wherein stretched synthetic fabric is disposed between a plunger and the plastic-glass composite wherein the stretched synthetic fabric transfers some of the plunger forces toward the perimeter of the plastic-glass composite during contact of the plunger with the composite.

9 Claims, 6 Drawing Figures

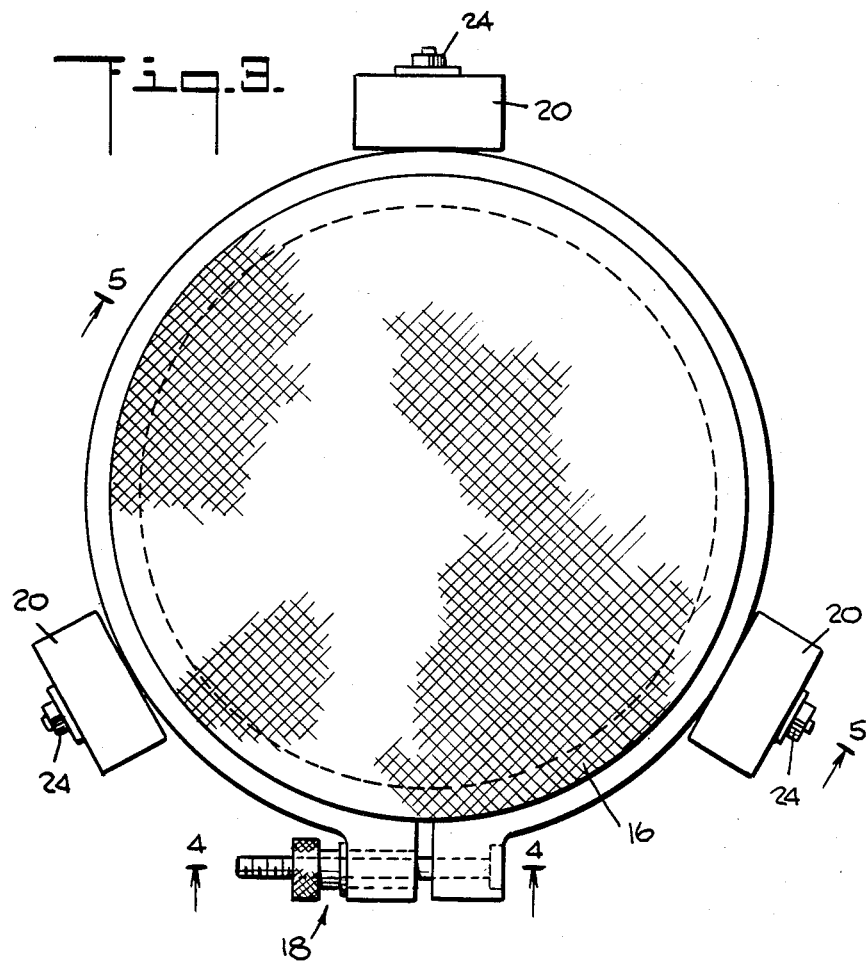
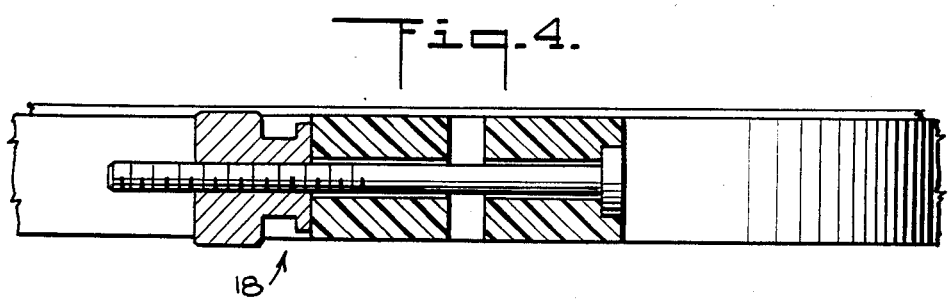
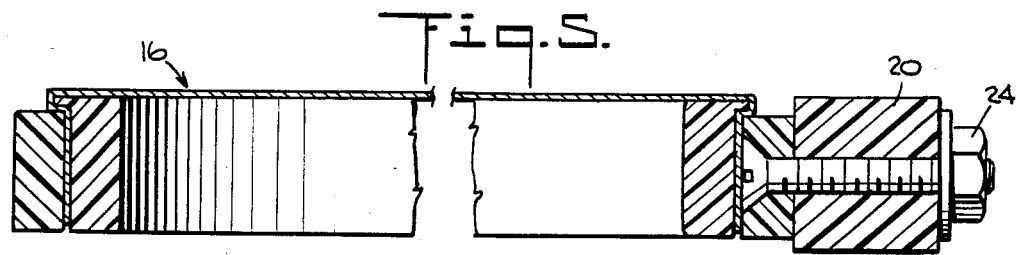

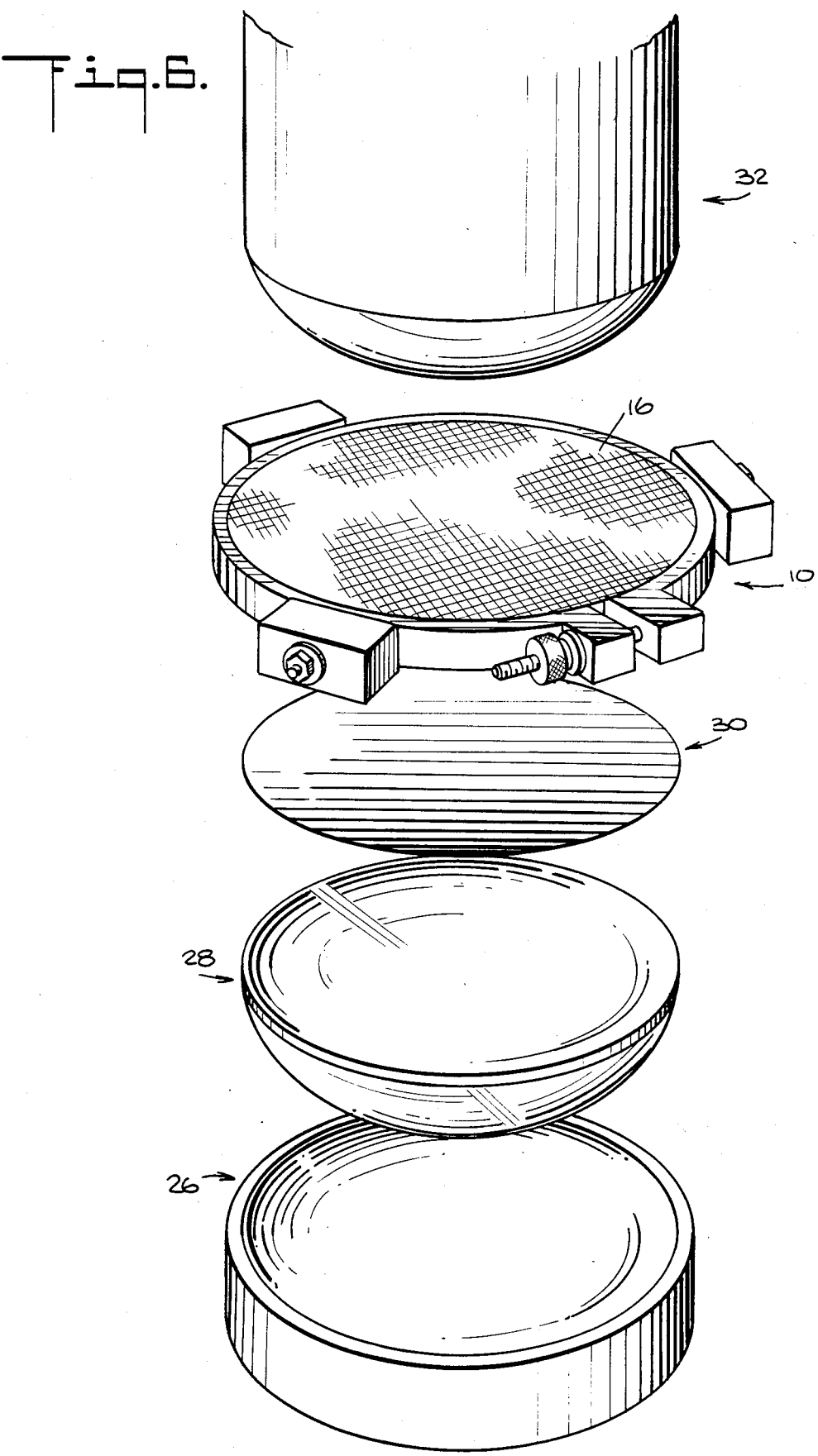

WRINKLE PREVENTION IN GLASS/PLASTIC COMPOSITE LENSES

This application is a division of my copending application Ser. No. 487,658 filed Apr. 22, 1983, now U.S. Pat. No. 4,494,344.

BACKGROUND OF THE INVENTION

1. Field of the Invention

This invention relates to optical lenses and more particularly to the production of glass-plastic composite ophthalmic lenses.

2. Description of the Prior Art

For many years optical lenses were made of glass. Notwithstanding the advantageous properties of glass for such use, glass ophthalmic lenses are heavy, and fragile. In recent years, plastic materials have come into use for the production of optical components. While plastic optical products are less expensive to manufacture and are lighter in weight than glass, they have the disadvantage of low index of refraction and insufficient resistance to scratch. In an effort to eliminate the disadvantages and combine the advantages associated respectively with glass and plastics, the prior art has produced glass-plastic composites for optical and ophthalmic use. Such composites may comprise an optically clear plastic laminated to a glass lens or a plastic lens body may be sandwiched between two glass shields.

The manufacturing of glass-plastic composites is not free of problems associated with the lamination of two components having different physical characteristics.

A major problem in the production of such composites is the occurrence of distortion and wrinkles in the flat plastic disc upon its lamination to the aspherical or toroidal shape glass component of the composite as will be described briefly hereunder.

In a typical procedure of making composites, an inorganic glass, prefinished by grinding and polishing to prescription on both of its major surfaces, is bonded to an organic, optically clear plastic material. The plastic material may be of a single layer or may be a composite of two layers, one of which serves as an adhesive promoting adherence of the plastic material to the glass component of the composite. This plastic material is in the form of individiual flat wafers. The lamination process includes prepositioning the glass over the wafer, applying pressure to the wafer surface using a pressing means such as a plunger designed to allow center to edge spreading of the wafer, and bonding the components together in an autoclave under appropriate temperature and pressure.

It has been found that the application of a plunger to accomplish lamination of the components caused distortions and wrinkles in a large percentage of the composites.

It is the principle object of the present invention to provide an apparatus for producing high quality glass-plastic composite optical products.

It is a further object of the invention to provide a method for producing high quality glass-plastic composite optical products by which a large percentage of loss as rejects is eliminated.

SUMMARY OF THE INVENTION

In accordance with the invention, the aforesaid objects are accomplished by:

(a) providing a lens blank mold or holder of a cup shape element having a concave optical surface;
(b) placing a prealigned, adhesively attached composite of a preformed glass and a flat optically clear plastic wafer into said lens blank mold or holder;
(c) proximately positioning a stretched elastic material over said glass-wafer composite using a doughnut-shape wrinkle preventor ring supporting said stretched elastic material and
(d) exerting a force on the stretched elastic material against said glass-wafer composite by a soft plunger and pressing the lens components against one another to effect lamination thereof.

BRIEF DESCRIPTION OF THE DRAWINGS

FIG. 3 is a top plan view of the wrinkle preventor ring;

FIG. 4 is a cross sectional view of the tensioning means taken along the line 4—4 of FIG. 3;

FIG. 5 is a cross sectional view of the wrinkle preventor ring taken along the line 5—5 of FIG. 3; and FIG. 6 is a perspective view of a lens-laminating mechanism showing in superimposed positions with respect to each other a lens blank holder, a glass lens, a plastic wafer, the wrinkle preventor ring, and a plunger.

DETAILED DESCRIPTION OF THE DRAWINGS

Figure 1:
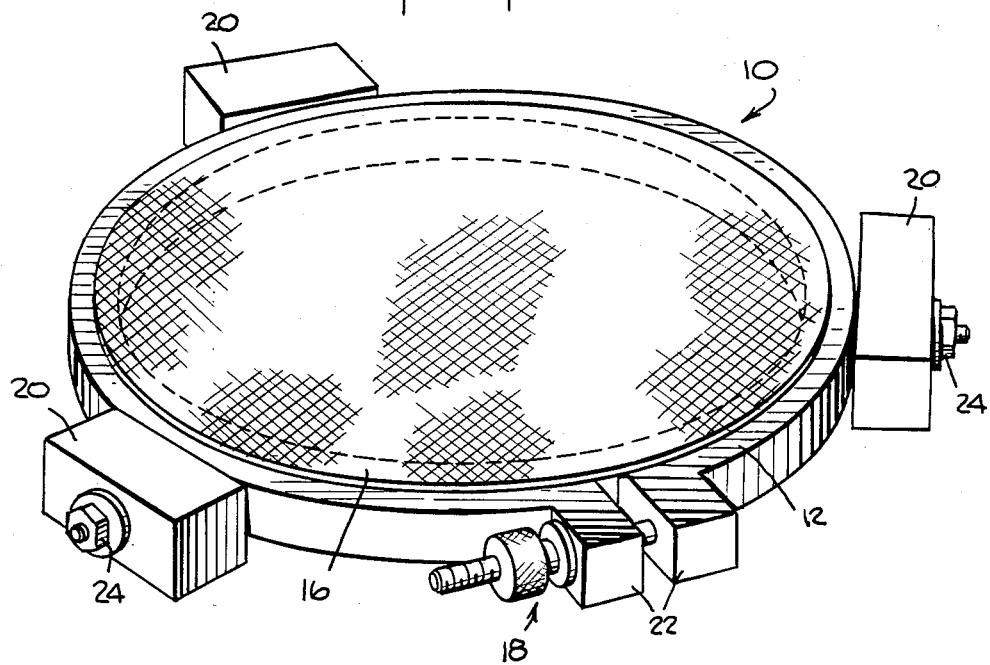
FIG. 1 is a perspective view of the wrinkle preventor ring.
Figure 2:
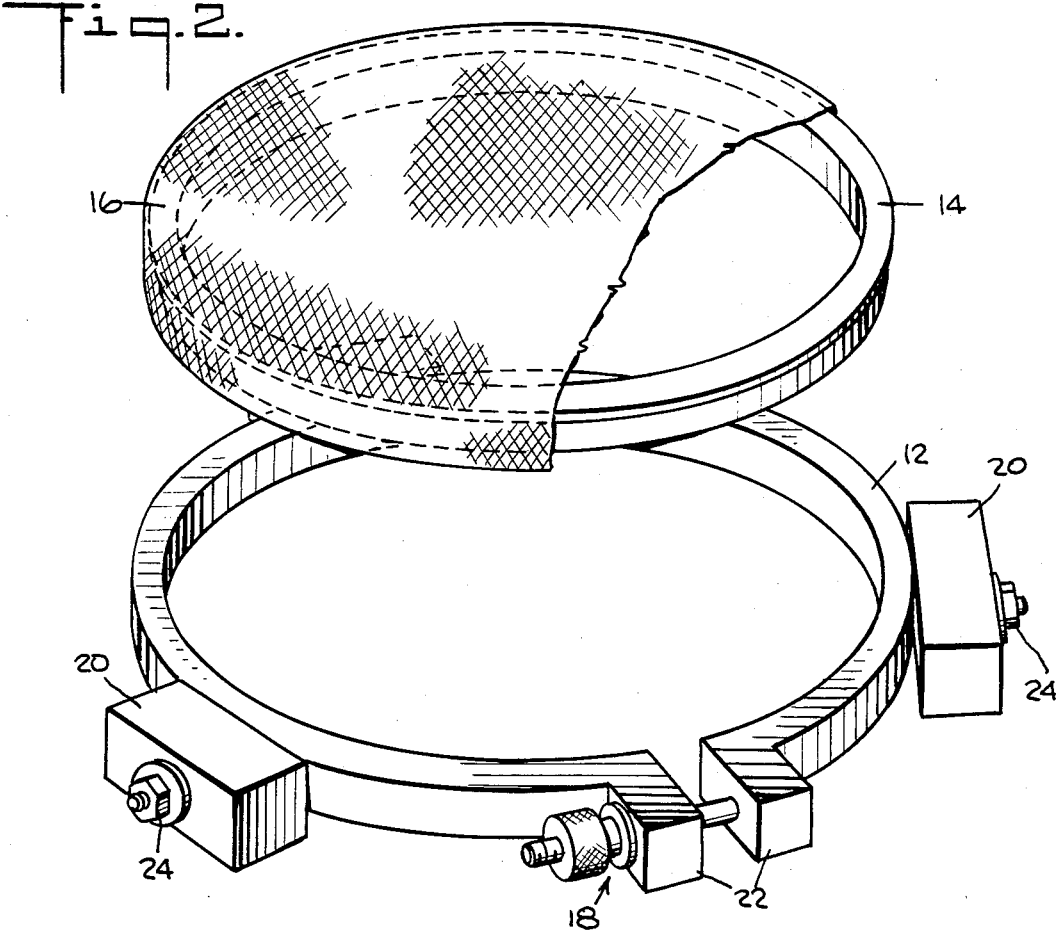
FIG. 2 a perspective view of the main components in unassembled positions of the wrinkle preventor ring of FIG. 1.

Reference is now made to FIGS. 1, 2, 3, 4 and 5. FIG. 1 shows the wrinkle preventor ring 10 of the present invention having as its main components: open outer ring 12 made of a strong flexible material, such as metal or plastic; inner ring 14 made of a resilient plastic material and having a smaller circumference than outer ring 12; and a stretched woven or knit fabric 16 of polyester, nylon, rubber, rubber or other extensible material with memory positioned over inner ring 14. Open outer ring 12 (FIG. 2) terminates in two parallel protrusions 22 which are adapted to receive a tensioning or adjusting means 18. Suitable adjusting means include a threaded rod equipped with a nut. Open ring 12 is further equipped with weight 20 (FIGS. 1, 2 and 3), which is fastened to open ring 12 by fastening means 24 (FIGS. 1, 2, 3 and 5).

Referring to FIG. 6, lens blank mold or holder 26 having a concave optical surface serves to receive glass lens 28. A flat, optically clear plastic wafer 30 is positioned over and aligned with said glass lens 28. Superimposed over lens blank mold or holder 26, containing glass lens 28 and flat plastic wafer 30, is positioned wrinkle preventor ring 10. Lamination of glass lens 28 and flat plastic wafer 30 is accomplished by exerting force via plunger 32 upon stretched fabric 16 of wrinkle preventor ring 10.

The wrinkle preventor ring 10, as indicated earlier, is provided with an extensible knit of woven fabric 16 in a stretched condition having a memory. Fabric 16 is stretched over inner ring 14 which is placed in open outer ring 12. By tightening adjusting means 18 outer ring 12 is forced against inner ring 14 and fabric 16 is firmly held therebetween.

The wrinkle preventor device of the present invention may be used in the manufacture of composite lenses in which at least two layers of materials at least one of which is polymeric are pressed together to form the final laminate. More particularly the device is used to circumvent the formation of wrinkles that form in the flat optical plastic disk or wafer when the same is laminated to a glass lens. Such wrinkles result in optical distortion making the finished product unsuitable for the intended use. The wrinkle preventor acts to distribute the force applied to the layers via a plunger resulting in a very substantial reduction of rejects due to optical distortion.

Typically, the lamination process is accomplished as follows:

After manufacture, the optical glass is cleaned and stored in a clean room to await lamination to an optical flat wafer. The wafer, after manufacture, is similarly cleaned. The two components are prepositioned or brought together via a pre-adhesion of the wafer to the glass by suitable means, such as by blowing the wafer against the glass surface in a vacuum system. The prepositioning components are then placed into lens blank mold or holder 26 having a concave optical surface. Wrinkle preventor ring 10 is then placed over lens holder 26. Stretched fabric 16, held in taut position and forced against lens holder 26 by the weight of said wrinkle preventor ring and weights 20 secured thereto, has no contact with the prepositioned lens components until plunger 32 is lowered against it stretching the same toward plastic wafer 30. Through the plunger a predetermined force is applied against the lens components. The stretched elastic fabric between plunger 32 and plastic wafer 30 distributes the downward force of the plunger and prevents wrinkle formation in said wafer. Upon application of the predetermined force, the lamination having been accomplished, the laminate is removed from lens holder 26 to be autoclaved, inspected and packaged.

While the present invention has been illustrated and described by means of preferred embodiments, it is to be understood that various changes and modifications may be made therein without departing from the spirit and scope of the invention as defined by the appended claims.

What is claimed is:

1. In a method of producing glass-plastic composite ophthalmic lenses, of the type wherein
   a flat plastic wafer is pre-positioned over an optically ground glass lens,
   the pre-positioned glass-plastic is placed into a lens mold or holder having a concave optical surface and
   an effective force is exerted against said flat plastic wafer by plunger means to effect lamination of said glass-plastic composite,
   the improvement comprising: superimposing over said mold or holder a wrinkle preventor device comprising an open outer ring and an inner ring having a stretched elastic material thereon so that exertion of force by said plunger means is against said elastic stretched material to accomplish lamination of said glass-plastic composite.

2. The method of claim 1 wherein said elastic material being forced against said glass-plastic lens components by said plunger means distribute said force to prevent optical distortion in said plastic component.

3. The method of claim 1 wherein said elastic material in a nylon fabric.

4. The method of claim 1 wherein said elastic material is a polyester fabric.

5. The method of claim 1 wherein said elastic material is a knit fabric.

6. The method of claim 1 wherein said elastic material is a woven fabric.

7. In a method of producing glass-plastic composite ophthalmic lenses of the type wherein
   an optically finished glass is adhesively united with an optically clear flat plastic wafer,
   said glass-plastic composite is placed into a lens blank holder, said holder having a concave optical surface,
   an effective force is exerted upon said flat plastic wafer to effect lamination of said glass-plastic composite through a plunger means and bonding the composite in an autoclave,
   the improvement comprising: placing over said lens holder a wrinkle preventor ring comprising an open outer ring ending in parallel protrusions spaced from each other and equipped with an adjusting means, an outer ring to snuggly fit into said outer ring, and an elastic stretched material covering said inner ring and held between said inner and outer rings by the force applied to said outer ring via said adjusting means so that exertion of force by said plunger means is against said elastic stretched material adapted to allow center to edge spreading of said plastic wafer component of said glass-plastic composite.

8. The method of claim 7 wherein said elastic material is a mesh fabric.

9. The method of claim 8 wherein said mesh fabric has a memory.

* * * * *